US008638478B2

(12) United States Patent
Yagi et al.

(10) Patent No.: US 8,638,478 B2
(45) Date of Patent: Jan. 28, 2014

(54) IMAGE READING APPARATUS, MOVING BODY FIXING STRUCTURE, AND ELECTRONIC EQUIPMENT

(75) Inventors: Takahiro Yagi, Kakegawa (JP); Hiroyuki Okada, Shinagawa (JP)

(73) Assignees: NEC AccessTechnica, Ltd., Shizuoka (JP); NEC Engineering, Ltd., Tokyo (JP)

( * ) Notice: Subject to any disclaimer, the term of this patent is extended or adjusted under 35 U.S.C. 154(b) by 58 days.

(21) Appl. No.: 13/443,379

(22) Filed: Apr. 10, 2012

(65) Prior Publication Data

US 2012/0257260 A1  Oct. 11, 2012

(30) Foreign Application Priority Data

Apr. 11, 2011  (JP) ................. 2011-087486

(51) Int. Cl.
*H04N 1/04* (2006.01)
(52) U.S. Cl.
USPC ............ 358/474; 358/497; 358/496; 358/498
(58) Field of Classification Search
USPC ........................ 358/474, 497, 496, 498, 475
See application file for complete search history.

(56) References Cited

U.S. PATENT DOCUMENTS 8,482,814 B2 *  7/2013  Hirokawa et al. ............. 358/474

FOREIGN PATENT DOCUMENTS

| JP | 1-113773 A | 5/1989 |
|---|---|---|
| JP | 9-289571 A | 11/1997 |
| JP | 10-294829 A | 11/1998 |
| JP | 2979576 B2 | 11/1999 |
| JP | 2005102137 A | 4/2005 |
| JP | 2007-79375 A | 3/2007 |
| JP | 4296673 B2 | 7/2009 |
| JP | 2010-54616 A | 3/2010 |
| JP | 2011-9987 A | 1/2011 |

OTHER PUBLICATIONS

Notification of Reasons for Refusal dated Jan. 8, 2013, issued by the Japanese Patent Office in counterpart Japanese Application No. 2011-087486.
Office Action dated Oct. 29, 2013 issued by the Japanese Patent Office in counterpart Japanese Application No. 2011087486 Partial Translation.

* cited by examiner

*Primary Examiner* — Houshang Safaipour
(74) *Attorney, Agent, or Firm* — Sughrue Mion, PLLC

(57) ABSTRACT

An image reading apparatus includes: a moving body on which a catch receiving portion is formed and which is movable in a predetermined direction; a fixing body on which a catching portion is formed to catch the catch receiving portion, and which is movable in a direction substantially orthogonal to the predetermined direction; a first position retaining portion for engaging a projected portion, formed on either one of a housing and the fixing body, with a first recessed portion formed on the other so that the fixing body can be retained in a position in which the catching portion catches the catch receiving portion; and a second position retaining portion for engaging the projected portion with a second recessed portion, formed on either the housing or the fixing body on which the first recessed portion is formed.

10 Claims, 5 Drawing Sheets

IMAGE READING APPARATUS, MOVING BODY FIXING STRUCTURE, AND ELECTRONIC EQUIPMENT

CROSS-REFERENCE TO RELATED APPLICATION

This application is based upon and claims the benefit of priority from Japanese patent application No. 2011-87486, filed on Apr. 11, 2011, the disclosure of which is incorporated herein in its entirety by reference.

BACKGROUND OF THE INVENTION

1. Field of the Invention

The present invention relates to an image reading apparatus having a moving body, a moving body fixing structure, and electronic equipment.

2. Description of the Related Art

An image reading apparatus such as a multifunction machine or a copying machine includes a moving body, such as a scanner or a carriage, movable inside the apparatus. In general, the moving body remains fixed from the time of shipment until completion of installation in a user environment. The reason is to prevent the moving body from being displaced or damaged when some sort of external force or impact is applied to the moving body during transportation, delivery, installation of the moving body, and the like. Various methods can be used as the method of fixing the moving body. Typical methods include the following three methods.

The first method is a method as disclosed in Patent Literature (PTL) 1, in which holes are bored in common parts of the housing of an apparatus and a moving body, and the common parts are screwed or fixed with a pin or using a hold-down spring to fix the housing.

The second method is a method as disclosed in Patent Literatures (PTLs) 2, 3, and 4, in which a lock receiving structure such as a pin or the like is provided on a moving body, and a locking structure (for sandwiching the lock receiving side or the like to restrict the position) is provided in a lever or a slide switch on the housing side to move the locking structure appropriately in order to fix the moving body to the housing.

The third method is a method as disclosed in Patent Literatures (PTLs) 5 and 6, in which when a moving body is moved to a fixed position, the moving body is automatically fixed by means of a locking mechanism.

PTL 1: Japanese Patent No. 2073095
PTL 2: Japanese Patent No. 4296673
PTL 3: Japanese Patent Application Publication No. 2007-079375
PTL 4: Japanese Patent Application Publication No. 2011-009987
PTL 5: Japanese Patent No. 2979576
PTL 6: Japanese Patent Application Publication No. 2010-054616

When the first method mentioned above is employed, the issue is handing of a screw or an inset used for fixation. Basically, the screw and the inset become useless after the fixation of the moving body is released. However, the moving body may be transported once again. Therefore, there is a need to keep the screw or the inset without throwing it in the trash. Further, a tool such as a screwdriver is required to release the fixation of the screw or the inset.

Further, when the first method is employed, the issue is dealing with a hole in the apparatus. Specifically, there will be problems of causing disfigurement of the apparatus, allowing dust or dust particles to enter the apparatus, and reducing the resistances of electric parts inside the apparatus to electrostatic potential unless the hole is closed. If the apparatus is designed to close the open hole in the apparatus with a lid or the like, the cost will increase.

When the second method is employed, the above problems can be solved. However, other problems may arise after the fixation of the moving body is released. Specifically, if a user touches a lever, a handle, a rotary switch, or a slide switch intentionally or unconsciously to cause the housing and the moving body to be fixed together, the locking structure and the moving body may crash into each other to cause a failure of the apparatus.

When the third method is employed, if an external force is applied in the direction of releasing the lock of the moving body, the lock may be released. In such a case, since the moving body is exposed to the external force or impact in an unfixed state, the moving body may be damaged.

SUMMARY OF THE INVENTION

It is an object of the present invention to provide an image reading apparatus, a moving body fixing structure, and electronic equipment, capable of preventing a failure of or damage to a moving body caused by user's mishandling or an external force.

An image reading apparatus according to the present invention includes: a moving body on which a catch receiving portion is formed and which is movable in a predetermined direction; a fixing body on which a catching portion is formed to catch the catch receiving portion in order to fix the moving body in a predetermined position, and which is movable in a direction substantially orthogonal to the predetermined direction; a first position retaining portion for engaging a projected portion, formed on either one of a housing and the fixing body, with a first recessed portion formed on the other so that the fixing body can be retained in a position in which the catching portion catches the catch receiving portion; and a second position retaining portion for engaging the projected portion with a second recessed portion, formed on either the housing or the fixing body on which the first recessed portion is formed, so that the fixing body can be retained in a position in which the catching portion does not catch the catch receiving portion.

A moving body fixing structure according to the present invention includes: a moving body on which a catch receiving portion is formed and which is movable in a predetermined direction; a fixing body on which a catching portion is formed to catch the catch receiving portion in order to fix the moving body in a predetermined position, and which is movable in a direction substantially orthogonal to the predetermined direction; a first position retaining portion for engaging a projected portion, formed on either one of a housing and the fixing body, with a first recessed portion formed on the other so that the fixing body can be retained in a position in which the catching portion catches the catch receiving portion; and a second position retaining portion for engaging the projected portion with a second recessed portion, formed on either the housing or the fixing body on which the first recessed portion is formed, so that the fixing body can be retained in a position in which the catching portion does not catch the catch receiving portion.

Electronic equipment according to the present invention includes: a moving body on which a catch receiving portion is formed and which is movable in a predetermined direction; a fixing body on which a catching portion is formed to catch the catch receiving portion in order to fix the moving body in a predetermined position, and which is movable in a direction substantially orthogonal to the predetermined direction; a first position retaining portion for engaging a projected portion, formed on either one of a housing and the fixing body, with a first recessed portion formed on the other so that the fixing body can be retained in a position in which the catching portion catches the catch receiving portion; and a second position retaining portion for engaging the projected portion with a second recessed portion, formed on either the housing or the fixing body on which the first recessed portion is formed, so that the fixing body can be retained in a position in which the catching portion does not catch the catch receiving portion.

According to the present invention, a failure of or damage to the moving body caused by user's mishandling or an external force can be prevented.

DESCRIPTION OF THE PREFERRED EMBODIMENTS

First Embodiment

A first embodiment will be described below with reference to the accompanying drawings. Note that the names of directions (right, left, up, and down) in the following description indicate directions on the drawings as seen from the cross section shown in a sectional view of FIG. 1. Electronic equipment in this embodiment is an image reading apparatus having a moving body fixing structure. However, the electronic equipment is not limited to the image reading apparatus, and it may be any other electronic equipment such as a printer having a moving body.

Figure 1:
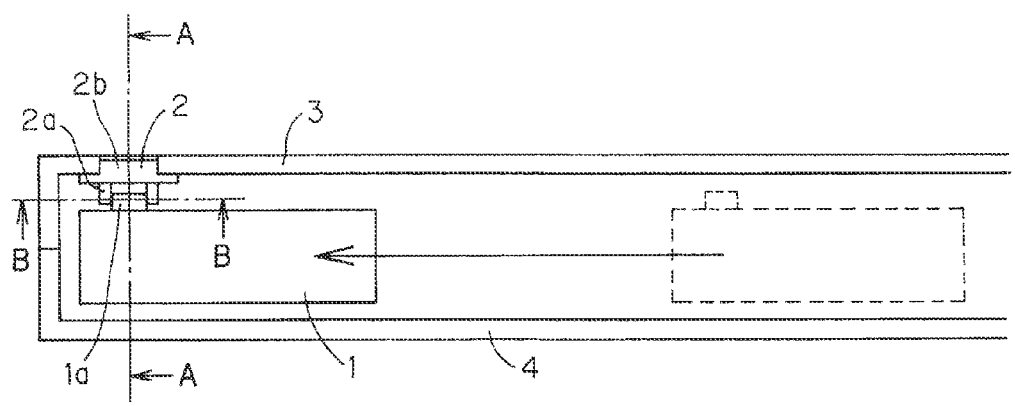
FIG. 1 is a schematic sectional view showing the structure of an image reading apparatus of a first embodiment.

FIG. 1 is a schematic sectional view showing an example of the structure of an image reading apparatus of the first embodiment. In the embodiment, the image reading apparatus includes a moving body 1, a fixing body 2, a top cover 3, and a bottom cover 4. Note that, in the embodiment, an object existing in the image reading apparatus and reciprocating therein, such as a reading module called a scanner, a lens carriage, or a mirror carriage is referred to as the moving body 1.

In the moving body 1, there are a lens, a mirror, and a CCD or a CIS to perform reading. These elements reciprocate in the apparatus by a driving force received from a motor or the like through a wire or a belt.

The moving body 1 is basically designed to reciprocate in a sub-scanning direction (corresponding to the horizontal (right-and-left) direction in FIG. 1). The sub-scanning direction is a direction in which the moving body 1 can move most easily when an external force or impact is imposed. Therefore, it is the direction in which the movement of the moving body 1 during a non-operational period should be most restricted.

Further, as shown in FIG. 1, the moving body 1 has a catch receiving portion 1a used when the moving body 1 is to be fixed. The catch receiving portion 1a is formed in a portion of the moving body 1 in the shape of a projection.

The fixing body 2 is attached in such a state that it penetrates through part of the top cover 3 to enable fixation and release operations from the outside of the apparatus. The fixing body 2 includes a lever portion 2a as a body part functioning also as a lever or a switch, and a catching portion 2b used when the moving body 1 is to be fixed.

In the embodiment, the fixing body 2 is used to fix the moving body 1 to the apparatus. The fixing body 2 is not fixed to the top cover 3. The fixing body 2 is movable in parallel with the top cover 3 in the cross section shown in FIG. 1. The catch receiving portion 1a of the moving body 1 and the catching portion 2b of the fixing body 2 are arranged on the horizontal plane in the movable direction of the fixing body 2.

Figure 2:
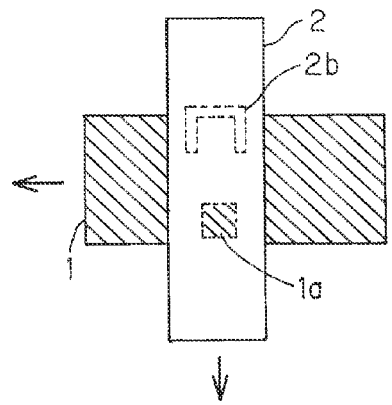
FIG. 2 is a top view as seen from the top side of the image reading apparatus.

FIG. 2 is a top view as seen from the top face side of the image reading apparatus. As shown in FIG. 2, the fixing body 2 as seen from the top face side is movable in a direction substantially orthogonal to the sub-scanning direction in which the moving body 1 is movable.

The lever portion 2a has a projected region and a recessed region. The user can use the projected region and the recessed region to manually give the fixing body 2 a limited moving force without the need for a special tool.

Figure 3:
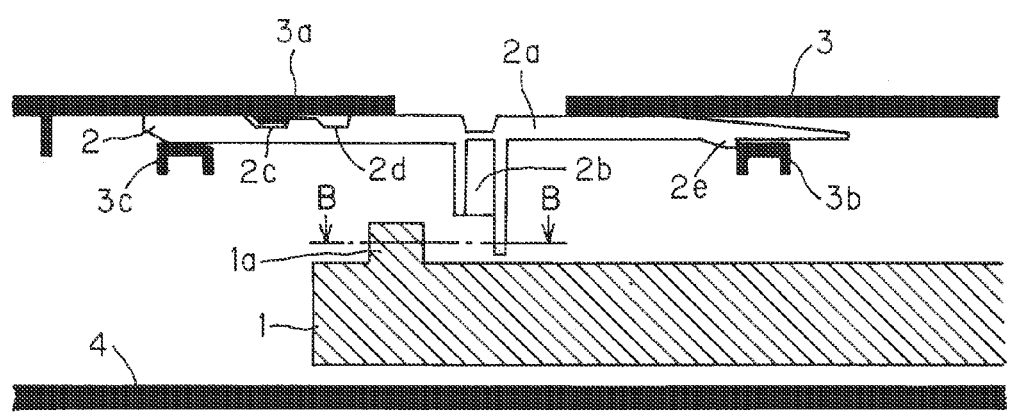
FIG. 3 is a sectional view along A-A direction when a moving body is in an unfixed state.
Figure 4:
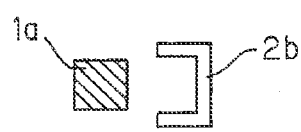
FIG. 4 is a sectional view along B-B direction when the moving body is in the unfixed state.
Figure 5:
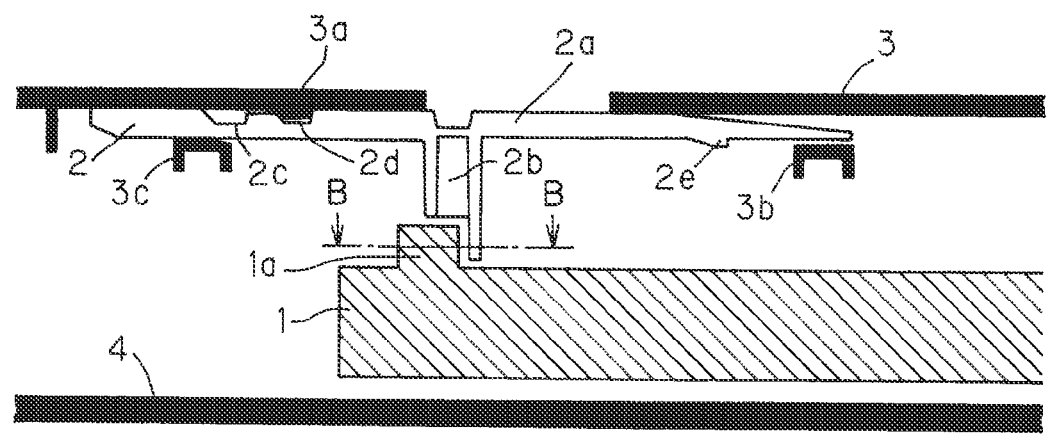
FIG. 5 is a sectional view along A-A direction when the moving body is in a fixed state.
Figure 6:
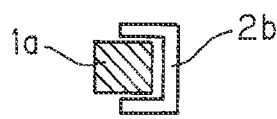
FIG. 6 is a sectional view along B-B direction when the moving body is in the fixed state.

FIG. 3 and FIG. 5 are sectional views along A-A direction shown in FIG. 1. FIG. 4 and FIG. 6 are sectional view along B-B direction shown in FIG. 3 and FIG. 5. Specifically, the cross section in A-A direction is a cross section when the image reading apparatus is cut vertically. The cross section in B-B direction is a cross section when the catch receiving portion 1a and the catching portion 2b are cut horizontally. FIG. 3 and FIG. 4 show part of the image reading apparatus when the moving body 1 is not fixed to the apparatus. FIG. 5 and FIG. 6 show part of the image reading apparatus when the moving body 1 is fixed to the apparatus.

As shown in FIG. 3 and FIG. 5, position retaining portions 2c, 2d, and 2e are formed in the fixing body 2. Further, position retaining portion 3a, 3b, and 3c are formed in the top cover 3.

The relationship between the moving body 1 and the fixing body 2 will be described. When the moving body 1 is not fixed to the apparatus, the catch receiving portion 1a and the catching portion 2b are kept at a distance from each other as shown in FIG. 3 and FIG. 4. Thus, there is nothing to restrict the position of the moving body 1.

FIG. 5 and FIG. 6 show a state in which the moving body 1 is fixed to the apparatus after the fixing body 2 moves. As shown in FIG. 5 and FIG. 6, the catch receiving portion 1a on the moving body 1 and the catching portion 2b on the fixing body 2 lie side by side. Thus, the catching portion 2b restricts the movement of the catch receiving portion 1a of the moving body 1 at least in one or more directions. In the embodiment, the U shape restricts movements in three directions plus an upward direction as seen in the cross section shown in FIG. 5. Further, the perimeter of the projection-shaped catch receiving portion 1a is surrounded by the walls of the catching portion 2b. As mentioned above, it is desired to restrict the movement of the moving body 1 in a direction in which it can move most easily, and the direction correspond to the vertical (up-and-down) direction in FIG. 6.

Next, the relationship between the fixing body 2 and the top cover 3 will be described. In the embodiment, the position retaining portion 3a on the top cover 3 is formed in the shape of a projection. The position retaining portions 2c and 2d are arranged in the fixing body 2 to form recessed regions into which the position retaining portion 3a is to be fitted. The position retaining portion 2c and 2d function as a member for restricting the position of the fixing body 2.

As shown in FIG. 3, when the moving body 1 is not fixed, the position retaining portion 3a on the top cover 3 is fitted in the position retaining portion 2c in the fixing body 2. The right sides and left sides of the position retaining portion 2c and the position retaining portion 3a lie side by side through slight clearance gaps. Thus, the fixing body 2 cannot move freely in the right-and-left direction.

Further, as shown in FIG. 3, since the right side of the position retaining portion 2e and the left side of the position retaining portion 3b lie side by side, movement in the right direction opposite to a direction in which the user moves the fixing body 2 to fix the moving body 1 is prevented more reliably.

When the fixing body 2 and the top cover 3 are deflected in the up-and-down direction in FIG. 3 due to their own deformation, under their own weights, or by external forces, the clearance gap between the side face of the position retaining portion 2c and the side face of the position retaining portion 3a, and the clearance gap between the side face of the position retaining portion 2e and the side face of the position retaining portion 3b become smaller. In this case, the effect of retaining the position is degraded to enable the fixing body 2 to move easily in the right-and-left direction in FIG. 3.

In addition to the structure for retaining the position in the right-and-left direction as mentioned above, the image reading apparatus of the embodiment also has a structure for allowing the top cover 3 to use the position retaining portion 3b and the position retaining portion 3c to sandwich the fixing body 2 in the up-and-down direction. This prevents the fixing body 2 and the top cover 3 from moving away from each other in the up-and-down direction. In other words, free right-and-left movements of the fixing body 2 are restricted reliably.

On the other hand, when the moving body 1 is fixed as shown in FIG. 5, the position retaining portion 3 on the top cover 3 is fitted in the position retaining portion 2d in the fixing body 2. Thus, like in the state before the moving body 1 is fixed as shown in FIG. 3, the right sides and left sides of the position retaining portion 2d and the position retaining portion 3a lie side by side through slight clearance gaps. Further, the top cover 3 uses the position retaining portion 3b and the position retaining portion 3c to sandwich the fixing body 2 in the up-and-down direction. Thus, free movements of the fixing body 2 is restricted.

The basic structure of the moving body fixing structure is as mentioned above. More specifically, the structure for restricting the position of the fixing body 2 in respective states includes the right and left adjacent sides of the position retaining portion 2c or the position retaining portion 2d and the position retaining portion 3a (also the right adjacent sides of the position retaining portion 2e and the position retaining portion 3b in such a state that the fixation of the moving body 1 is released), and sandwiching of the fixing body 2 in the up-and-down direction between the top cover 3 and the position retaining portions 3b and 3c.

The position retaining force of the fixing body 2 when the moving body 1 is fixed is called "fixed-state retaining force."

The position retaining force of the fixing body 2 when the fixation of the moving body 1 is released is called "released-state retaining force." The moving force applied to the fixing body 2 to change the state of the moving body 1 from the fixation-released state to the fixed state is called "fixation-imparting force." The moving force applied to the fixing body 2 to change the state of the moving body 1 from the fixed state to the fixation-released state is called "release-imparting force."

The retaining force is determined depending on the structure of the apparatus. The imparting force depends mainly on human power. As the retaining force increases, a larger imparting force is required when the fixing body 2 is moved. As the retaining force decreases, a smaller imparting force is enough to make the fixing body 2 movable easily.

When the released-state retaining force is weak, the fixing body 2 is driven to move by a small fixation-imparting force. Therefore, when the moving body 1 is not located in a fixed standby position, if the user touches the lever portion 2a consciously or unconsciously, the fixing body 2 may move. If the fixing body 2 moves, the catch receiving portion 1a of the moving body 1 and the catching portion 2b of the fixing body 2 may crash into each other. In such a case, the apparatus may suffer damage.

On the other hand, when the released-state retaining force is strong, a large fixation-imparting force is required to move the fixing body 2. Therefore, there is no problem with worker's handling upon shipment, but when the user has to do handling, it may be difficult to do handling or the position retaining portion may be deformed.

Further, when the fixed-state retaining force is weak, the fixing body 2 is driven to move by a small release-imparting force. Therefore, when an external force is applied in a direction to release the catch to the moving body 1, the fixation may be released.

On the other hand, when the fixed-state retaining force is strong, a large release-imparting force is required to move the fixing body 2. Therefore, when the user or an installation technician conducts fixation releasing upon installation or the like, the handling may be difficult or the position retaining portion may be deformed.

It is therefore preferred to set the optimum value for each retaining force in consideration of usability and functionality. In the embodiment, the retaining force is adjustable freely and easily in each position retaining portion.

In the embodiment, for example, as the angles of the right and left adjacent sides of the position retaining portions 2c, 2d, 2e, 3a, and 3b are brought close to the right angles, the retaining forces increase. On the other hand, as the angles become out of perpendicular, the retaining forces decrease, making it easy for the fixing body 2 to move.

Further, as the heights of the position retaining portions 3a and 2e are increased, the retaining forces increase. On the other hand, as the heights of the position retaining portions 3a and 2e are reduced, the retaining forces decrease. Further, as the clearance gaps between the fixing body 2 and the top cover 3, and the position retaining portions 3b and 3c are increased, the fixing body 2 is more likely to be deflected and hence the retaining forces decrease. On the other hand, the clearance gaps are reduced, the retaining forces increase.

Referring next to FIG. 3 through FIG. 6, description will be made of handling when the fixing body 2 is moved to fix the moving body 1 and release the fixation in the embodiment.

As mentioned above, the fixing body 2 shown in FIG. 3 is normally restricted not to move freely. To move the fixing body 2 from this condition to fix the moving body 1, the user uses the lever portion 2a to apply a force, equal to or larger than the retaining force between the right side of the position retaining portion 2c and the right side of the position retaining portion 3a, to the fixing body 2 in the left moving direction. As a result, the top cover 3 and the fixing body 2 are deflected temporarily near the position retaining portions to cause a mountain-like portion between the position retaining portion 2c and the position retaining portion 2d to hop over the position retaining portion 3a of the top cover 3 instantaneously. As a result, the fixing body 2 moves to the left. As a result, as shown in FIG. 5, the position retaining portion 2d and the position retaining portion 3a are fitted.

In other words, the movement of the fixing body 2 to the left causes the catching portion 2b on the fixing body 2 to lie adjacent to the catch receiving portion 1a on the moving body 1, restricting the position of the moving body 1. Thus, the position of the moving body 1 can be restricted.

On the contrary, when the moving body 1 is changed from the fixed state as shown in FIG. 5 to the unfixed state as shown in FIG. 3, the user uses the lever portion 2a to apply a force, equal to or larger than the retaining force between the left side of the position retaining portion 2d and the left side of the position retaining portion 3a, to the fixing body 2 in the right moving direction. As a result, the mountain-like portion between the position retaining portion 2c and the position retaining portion 2d hops over the position retaining portion 3a of the top cover 3 instantaneously. As a result, the fixing body 2 moves to the right. Then, as shown in FIG. 3, the position retaining portion 2c and the position retaining portion 3a are fitted.

In other words, the movement of the fixing body 2 to the right separates the catch receiving portion 1a on the moving body 1 from the catching portion 2b on the fixing body 2. Thus, the moving body 1 enters the unfixed state without position restriction.

The structure described above is so provided that when the moving body fixing structure of the embodiment is used, the following effects can be obtained.

The first effect is that, since the retaining forces used to fix the moving body 1 and release the fixation can be exerted freely and easily in the position retaining portion of each part, adequate fixation retaining force and release retaining force can be set appropriately depending on the conditions assumed at the place of production, the form of transport, the conditions of an installation technician, and the apparatus conditions assumed by an end user.

The second effect is that, since a position retaining mechanism (i.e., the position retaining portions 3c and 3b) is provided to act on the fixing body 2 not only in the operating direction but also in a direction to suppress deflection, adequately set retaining forces can work accurately.

For example, when the method disclosed in PTL 4 is employed, elasticity is given only to a claw-shaped portion formed on the lock member, and hence it is difficult to adjust the retaining force. Further, when a transient force is applied, a load is placed only at a point of the claw-shaped portion. Therefore, the lock member may be damaged. However, in the embodiment, since the load is distributed to the entire fixing body, such a possibility is excluded.

The third effect is that, since the adequately set retaining forces work accurately, the catching structure and the moving body are not likely to crash into each other even when the user touches a fixation dealing portion consciously or unconsciously. Further, when the fixed-state retaining force is weak and an external force is applied to the moving body 1 in a direction to release the catch, the possibility of releasing the catch to release the fixed state is reduced.

When the moving body fixing structure of the embodiment is employed, the following effects can further be obtained.

The fourth effect is that, since an additional part used to implement the function of catching the moving body is only the fixing body, it is easy to assemble the moving body fixing structure and the cost of the moving body fixing structure is low. The reason for this is that, since the number of parts is small, the assembly procedure is simplified, the parts are inexpensive, and assembly man-hours are reduced. Another reason is that part of electronic equipment such as the image reading apparatus is used as a member for catching the moving body.

The fifth effect is that, since the catch receiving portion is provided in a portion of the moving body so that the user will handle the fixing body incorporated in the housing to catch the moving body, no tool is required to fix the moving body and release the fixation, and hence there is no part that becomes unnecessary after being handled but needs keeping.

The sixth effect is that, since the moving body fixing structure is a structure without the need to bore a hole or provide a clearance gap in the housing, the possibilities of causing disfigurement of the apparatus, allowing dust or dust particles to enter the apparatus, and reducing the resistances of electric parts inside the apparatus to electrostatic potential are reduced.

Note that the recess and projection relation in respective position retaining portions may be opposite to that in the embodiment. The moving direction of the fixing body 2 and the moving direction of the catching portion may be any directions.

Further, in the embodiment, the fixing body 2 and the handling portion exist on the top cover 3, but they may be provided on the side face or the bottom face of the top cover 3.

Further, in the embodiment, multiple faces of the catch receiving portion provided on the moving body 1 are restricted through predetermined clearance gaps by the catching portion provided on the fixing body 2 to fix the moving body 1. However, the moving body 1 may be held down without any clearance gap. For example, like in a second embodiment to be described below, a flat spring for creating a hold-down force in a predetermined direction may be so added that the retaining force upon fixing the moving body will be increased by the flat spring.

Second Embodiment

Figure 7:
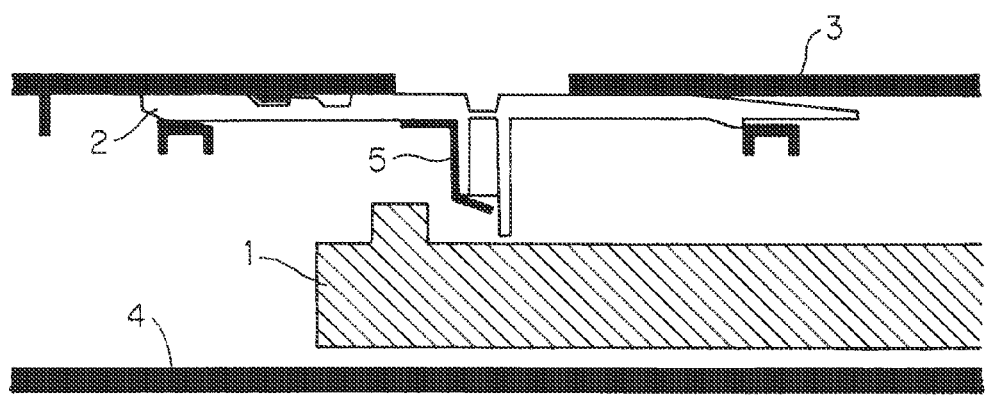
FIG. 7 is a sectional view along A-A direction when the moving body is in an unfixed state in a second embodiment.
Figure 8:
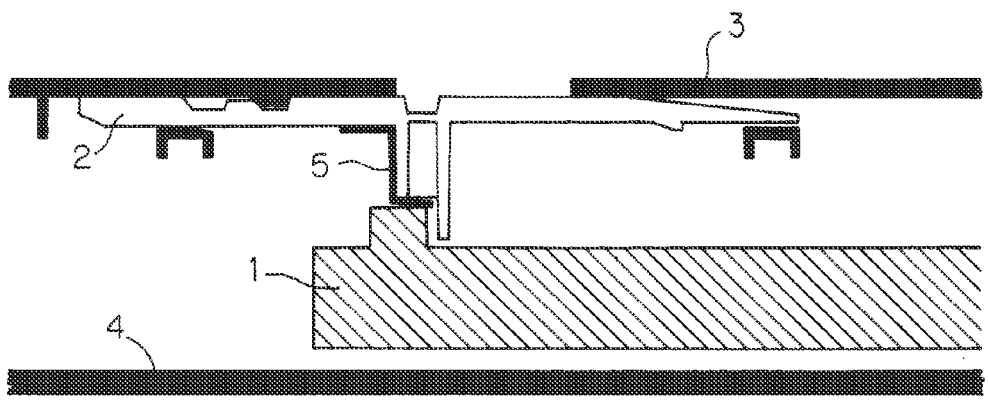
FIG. 8 is a sectional view along A-A direction when the moving body is in a fixed state.

Next, the second embodiment of the image reading apparatus according to the present invention will be described with reference to FIG. 7 and FIG. 8. FIG. 7 is a sectional view of the image reading apparatus along A-A direction when the moving body is not fixed. FIG. 8 is a sectional view of the image reading apparatus along A-A direction when the moving body is fixed.

As shown in FIG. 7 and FIG. 8, in the embodiment, a flat spring 5 as an object for adding a retaining force is bonded to the fixing body 2 in addition to the structure of the first embodiment. The flat spring 5 is bonded to the fixing body 2 in such a manner to come into contact with the moving body 1 and be deformed when the fixing body 2 is moved to a position at which the moving body 1 is fixed.

As shown in FIG. 7, when the moving body is unfixed, the flat spring 5 is free and does not particularly affect the moving body 1. However, when the fixing body 2 is moved to fix the moving body 1 as shown in FIG. 8, a repulsive force of the flat spring 5 deformed in contact with the moving body 1 is generated to produce a retaining force for holding down the moving body 1 in the downward direction. This can realize a stronger fixed/retained state.

In this embodiment, the flat spring is used as an object for adding a retaining force, but it is not limited to the flat spring. For example, a coil spring, a sponge, an elastic body made of plastic, or the like may be used.

Further, in the embodiment, a retaining force for holding down the moving body 1 in the downward direction of the cross section shown in FIG. 8 is generated by the flat spring as the object for adding the retaining force, but the direction to attach the object for adding the retaining force and the direction to generate the retaining force can be set voluntarily. Two or more objects for adding retaining forces may also be provided. Further, the retaining forces may work in two or more directions.

As described above, the embodiment can obtain such an effect that a stronger retaining force can be realized in any direction can be obtained in addition to the effects of the first embodiment.

In the aforementioned first embodiment and second embodiment, the moving body 1 is a member related to image reading such as a scanner or a lens carriage. However, for example, the moving body 1 may be an ink carriage.

Figure 9:
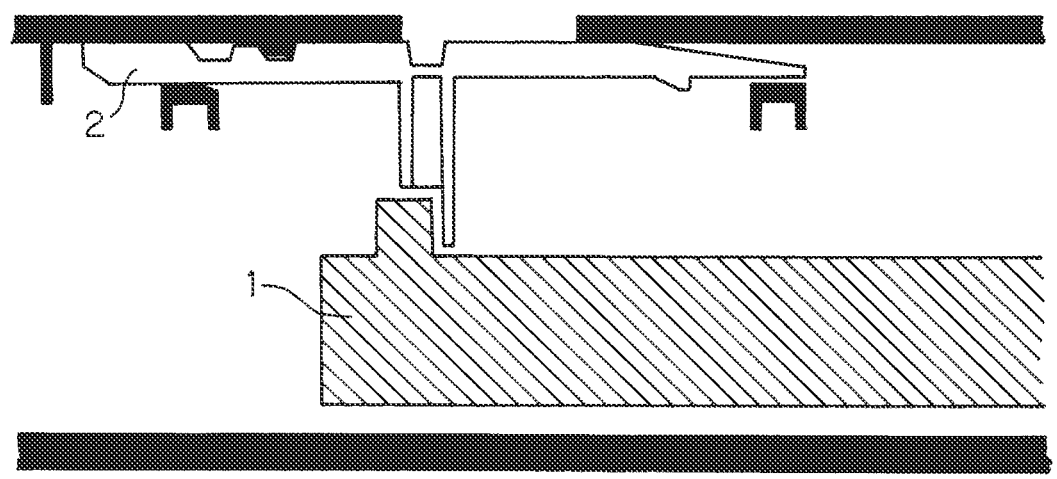
FIG. 9 is a sectional view showing an example of the structure of an image reading apparatus.

FIG. 9 is a sectional view showing a major part of an image reading apparatus. As shown in FIG. 9, the image reading apparatus includes: a moving body on which a catch receiving portion (e.g., realized by the catch receiving portion 1*a*) is formed and which is movable in a predetermined direction; a fixing body on which a catching portion (e.g., realized by the catching portion 2*b*) is formed to catch the catch receiving portion in order to fix the moving body in a predetermined position, and which is movable in a direction substantially orthogonal to the predetermined direction; a first position retaining portion (e.g., realized by the position retaining portion 3*a* and the position retaining portion 2*d*) for engaging a projected portion (e.g., realized by the position retaining portion 3*a*), formed on either one of a housing (e.g., realized by the top cover 3) and the fixing body, with a first recessed portion (e.g., realized by the position retaining portion 2*d*) formed on the other so that the fixing body can be retained in a position in which the catching portion catches the catch receiving portion; and a second position retaining portion (e.g., realized by the position retaining portion 3*a* and the position retaining portion 2*c*) for engaging the projected portion with a second recessed portion (e.g., realized by the position retaining portion 2*c*), formed on either the housing or the fixing body on which the first recessed portion is formed, so that the fixing body can be retained in a position in which the catching portion does not catch the catch receiving portion.

In the first embodiment and the second embodiment, characteristic structures of the image reading apparatus as shown in the following (1) to (5) are shown:

(1) The image reading apparatus in which the inclination angle of either or both faces of the projected portion and the first recessed portion is adjusted to adjust a retaining force for causing the first position retaining portion to retain the fixing body, and the inclination angle of either or both faces of the projected portion and the second recessed portion is adjusted to adjust a retaining force for causing the second position retaining portion to retain the fixing body.

(2) The image reading apparatus in which the height of either or both faces of the projected portion and the first recessed portion is adjusted to adjust a retaining force for causing the first position retaining portion to retain the fixing body, and the height of either or both faces of the projected portion and the second recessed portion is adjusted to adjust a retaining force for causing the second position retaining portion to retain the fixing body.

(3) The image reading apparatus in which the engagement between the projected portion and the first recessed portion or the engagement between the projected portion and the second recessed portion is released when the fixing body is deflected to move.

(4) The image reading apparatus further including a supporting portion (e.g., realized by the position retaining portions 3*b* and 3*c*) provided on the fixing body on a side opposite to the housing to support the fixing body, in which a clearance gap between the supporting portion and the housing is adjusted to adjust ease of deflection of the fixing body.

(5) The image reading apparatus in which a position retaining force adding portion is provided on the fixing body to hold down and retain the moving body in a predetermined position when the fixing body moves to the position in which the catching portion catches the catch receiving portion.

For example, the present invention is applicable to an apparatus having a moving body therein and preferred to fix the moving body against an external force or impact imposed on the apparatus during transportation and the like. A specific application example is an image reading apparatus, such as a multifunction machine or a copying machine, having therein a moving body such as a scanner or a carriage.

As described above, although the present invention is described with reference to the exemplary embodiments and examples, the present invention is not limited to the aforementioned exemplary embodiments and examples. Various changes that can be understood by those skilled in the art within the scope of the present invention can be made to the configurations and details of the present invention.

What is claimed is:

1. An image reading apparatus comprising:
   a moving body on which a catch receiving portion is formed and which is movable in a predetermined direction;
   a fixing body on which a catching portion is formed to catch the catch receiving portion in order to fix the moving body in a predetermined position, and which is movable in a direction substantially orthogonal to the predetermined direction;
   a first position retaining portion for engaging a projected portion, formed on either one of a housing and the fixing body, with a first recessed portion formed on the other so that the fixing body can be retained in a position in which the catching portion catches the catch receiving portion; and
   a second position retaining portion for engaging the projected portion with a second recessed portion, formed on either the housing or the fixing body on which the first recessed portion is formed, so that the fixing body can be retained in a position in which the catching portion does not catch the catch receiving portion.

2. The image reading apparatus according to claim 1, wherein
   an inclination angle of either or both faces of the projected portion and the first recessed portion is adjusted to adjust a retaining force for causing the first position retaining portion to retain the fixing body, and
   an inclination angle of either or both faces of the projected portion and the second recessed portion is adjusted to adjust a retaining force for causing the second position retaining portion to retain the fixing body.

3. The image reading apparatus according to claim 1, wherein a height of either or both faces of the projected portion and the first recessed portion is adjusted to adjust a retaining force for causing the first position retaining portion to retain the fixing body, and a height of either or both faces of the projected portion and the second recessed portion is adjusted to adjust a retaining force for causing the second position retaining portion to retain the fixing body.

4. The image reading apparatus according to claim 1, wherein engagement between the projected portion and the first recessed portion or engagement between the projected portion and the second recessed portion is released when the fixing body is deflected to move.

5. The image reading apparatus according to claim 4, further comprising a supporting portion provided on the fixing body on a side opposite to the housing to support the fixing body, wherein a clearance gap between the supporting portion and the housing is adjusted to adjust ease of deflection of the fixing body.

6. The image reading apparatus according to claim 1, wherein a position retaining force adding portion is provided on the fixing body to hold down and retain the moving body in a predetermined position when the fixing body moves to the position in which the catching portion catches the catch receiving portion.

7. A moving body fixing structure comprising:

a moving body on which a catch receiving portion is formed and which is movable in a predetermined direction;

a fixing body on which a catching portion is formed to catch the catch receiving portion in order to fix the moving body in a predetermined position, and which is movable in a direction substantially orthogonal to the predetermined direction;

a first position retaining portion for engaging a projected portion, formed on either one of a housing and the fixing body, with a first recessed portion formed on the other so that the fixing body can be retained in a position in which the catching portion catches the catch receiving portion; and a second position retaining portion for engaging the projected portion with a second recessed portion, formed on either the housing or the fixing body on which the first recessed portion is formed, so that the fixing body can be retained in a position in which the catching portion does not catch the catch receiving portion.

8. The moving body fixing structure according to claim 7, wherein an inclination angle of either or both faces of the projected portion and the first recessed portion is adjusted to adjust a retaining force for causing the first position retaining portion to retain the fixing body, and an inclination angle of either or both faces of the projected portion and the second recessed portion is adjusted to adjust a retaining force for causing the second position retaining portion to retain the fixing body.

9. Electronic equipment comprising:

a moving body on which a catch receiving portion is formed and which is movable in a predetermined direction;

a fixing body on which a catching portion is formed to catch the catch receiving portion in order to fix the moving body in a predetermined position, and which is movable in a direction substantially orthogonal to the predetermined direction;

a first position retaining portion for engaging a projected portion, formed on either one of a housing and the fixing body, with a first recessed portion formed on the other so that the fixing body can be retained in a position in which the catching portion catches the catch receiving portion; and a second position retaining portion for engaging the projected portion with a second recessed portion, formed on either the housing or the fixing body on which the first recessed portion is formed, so that the fixing body can be retained in a position in which the catching portion does not catch the catch receiving portion.

10. The electronic equipment according to claim 9, wherein an inclination angle of either or both faces of the projected portion and the first recessed portion is adjusted to adjust a retaining force for causing the first position retaining portion to retain the fixing body, and an inclination angle of either or both faces of the projected portion and the second recessed portion is adjusted to adjust a retaining force for causing the second position retaining portion to retain the fixing body.

* * * * *